United States Patent
Zhang et al.

(10) Patent No.: US 10,442,905 B2
(45) Date of Patent: Oct. 15, 2019

(54) POLYURETHANE PULTRUSION ARTICLE

(71) Applicant: Covestro Deutschland AG, Leverkusen (DE)

(72) Inventors: Chenxi Zhang, Shanghai (CN); Zhan (James) Chen, Shanghai (CN); Zhijiang Li, Shanghai (CN); Fei Wu, YiChang (CN); Hui Zhao, Shanghai (CN)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 187 days.

(21) Appl. No.: 15/539,415

(22) PCT Filed: Dec. 21, 2015

(86) PCT No.: PCT/EP2015/080840
§ 371 (c)(1),
(2) Date: Jun. 23, 2017

(87) PCT Pub. No.: WO2016/102496
PCT Pub. Date: Jun. 30, 2016

(65) Prior Publication Data
US 2019/0127538 A1 May 2, 2019

(30) Foreign Application Priority Data
Dec. 24, 2014 (CN) .......................... 2014 1 0854460

(51) Int. Cl.
C08J 5/24 (2006.01)
C08J 7/04 (2006.01)
C08K 5/00 (2006.01)
B32B 5/00 (2006.01)
C08G 18/48 (2006.01)
C08G 18/66 (2006.01)
C08G 18/76 (2006.01)
C08G 18/24 (2006.01)
C08G 18/32 (2006.01)
B29C 70/52 (2006.01)
B29K 75/00 (2006.01)

(52) U.S. Cl.
CPC ................ C08J 5/24 (2013.01); B29C 70/52 (2013.01); B32B 5/00 (2013.01); C08G 18/246 (2013.01); C08G 18/3206 (2013.01); C08G 18/4812 (2013.01); C08G 18/4816 (2013.01); C08G 18/4825 (2013.01); C08G 18/4829 (2013.01); C08G 18/6677 (2013.01); C08G 18/7664 (2013.01); C08J 7/047 (2013.01); C08K 5/0066 (2013.01); B29K 2075/00 (2013.01); C08J 2375/08 (2013.01); C08J 2427/12 (2013.01)

(58) Field of Classification Search
CPC ....... B29C 70/52; B29K 2075/00; B32B 5/00; B32B 5/24; C08G 18/246; C08G 18/3206; C08G 18/4812; C08G 18/4816; C08G 18/4825; C08G 18/4829; C08G 18/6677; C08G 18/7664; C08J 2375/08; C08J 2427/12; C08J 5/24; C08J 7/047; C08K 5/0066
USPC ......................... 428/423.1, 424.2; 528/60, 65
See application file for complete search history.

(56) References Cited

U.S. PATENT DOCUMENTS

| 2012/0252973 | A1 | 10/2012 | Nienkemper et al. | |
| 2014/0106637 | A1* | 4/2014 | Bertucelli | C08J 5/24 442/136 |
| 2016/0167259 | A1* | 6/2016 | Plagemann | C09D 133/00 428/141 |

FOREIGN PATENT DOCUMENTS

WO   WO 2007/090259 A1   8/2007

OTHER PUBLICATIONS

International Search Report and Written Opinion for International Application No. PCT/EP2015/080840, European Patent Office, dated Mar. 17, 2016.
Polyol Ixol ® B 251—Safety Data Sheet, Solvay, United Kingdom, Version 1.1, P 20178, revised Dec. 17, 2010, 8 pages.

* cited by examiner

Primary Examiner — Thao T Tran
(74) Attorney, Agent, or Firm — K&L Gates LLP

(57) ABSTRACT

The invention provides a polyurethane pultrusion article comprising a polyurethane pultrusion composite and a coating layer applied thereon, wherein the polyurethane pultrusion composite comprises a polyurethane resin matrix and a reinforcement material, and is prepared by a polyurethane pultrusion process, wherein the polyurethane resin matrix is prepared from a polyurethane composition comprising: A) an isocyanate component comprising one or more polyisocyanates; B) an isocyanate-reactive component comprising: b1) a first polyether polyol having a functionality of 2-3 and a hydroxyl number of 10-120 mgKOH/g; b2) a second polyether polyol having a functionality of 3-8 and a hydroxyl number of 810-1900 mgKOH/g; b4) one or more isocyanate-reactive flame retardants. The polyurethane pultrusion article provided by the invention has both favorable flame retardance and good adhesion between the coating layer and the composite.

4 Claims, No Drawings

US 10,442,905 B2

POLYURETHANE PULTRUSION ARTICLE

CROSS-REFERENCE TO RELATED APPLICATIONS

This application is a U.S. national stage application, filed under 35 U.S.C. § 371, of PCT/EP2015/080840, which was filed on Dec. 21, 2015, and which claims priority to Chinese Patent Application No. 201410854460.0, which was filed on Dec. 24, 2014, the contents of each of which are incorporated by reference into this specification.

TECHNICAL FIELD

The invention relates to a polyurethane pultrusion article which comprises a polyurethane pultrusion composite and a coating layer applied thereon, and has both favorable flame retardance and good adhesion between the coating layer and the polyurethane pultrusion composite.

BACKGROUND ART

Polyurethane pultrusion materials are widely used in the industry sector owing to their high content of glass fiber and good physical properties. However, in the case of long-term outdoor use, particularly under extreme weather conditions on islands or in deserts, etc, application of outside coating is still necessary for protection.

Unfortunately, the prior art coatings, particularly weatherable fluorocarbon coatings, have poor adhesion to polyurethane pultrusion composite materials, such that the coatings tend to peel off when used outdoor for a long time, and consequently the composite materials will be exposed and powdered.

As such, there has been a long desire in the art for a polyurethane pultrusion composite material having superior coating performance.

SUMMARY OF THE INVENTION

According to the invention, there is provided a polyurethane pultrusion article comprising a polyurethane pultrusion composite and a coating layer applied thereon, wherein the polyurethane pultrusion composite comprises a polyurethane resin matrix and a reinforcement material, and is prepared by a polyurethane pultrusion process, wherein the polyurethane resin matrix is prepared from a polyurethane composition comprising:

A) an isocyanate component comprising one or more polyisocyanates;

B) an isocyanate-reactive component comprising:

b1) a first polyether polyol having a functionality of 2-3 and a hydroxyl number of 10-120 mgKOH/g;

b2) a second polyether polyol having a functionality of 3-8 and a hydroxyl number of 810-1900 mgKOH/g;

b4) one or more isocyanate-reactive flame retardants.

In some embodiments of the invention, the isocyanate-reactive flame retardant comprises halogen and/or phosphorus. Preferably, the reactive flame retardant is one or more selected from the group consisting of aromatic or aliphatic bromide alcohol, diol or triol, halogenated aliphatic polyether diol and triol.

In some other embodiments of the invention, the coating layer is prepared from fluoroalkene-vinyl ether (FEVE) coating and/or polyvinylidene fluoride (PVDF) coating.

In still some other embodiments of the invention, the reinforcement material is selected from the group consisting of glass fibers, carbon nanotubes, carbon fibers, polyester fibers, natural fibers, aramid fibers, nylon fibers, basalt fibers, boron fibers, silicon carbide fibers, asbestos fibers, whiskers, hard particles, metal fibers and combinations thereof. Preferably, the reinforcement material has an amount of 60-85 wt. % based on 100% by weight of the polyurethane pultrusion composite.

In yet some other embodiments of the invention, the isocyanate-reactive component B) further comprises:

b3) a third polyether polyol having a functionality of 3-8 and a hydroxyl number of 150-800 mgKOH/g;

In yet some other embodiments of the invention, the coating layer is prepared by spin coating, knife coating, micro-gravure coating, direct gravure coating, offset gravure coating, reverse gravure coating, reverse roll coating, bar coating, die coating, spray coating or dip coating.

DETAILED DESCRIPTION OF THE INVENTION

According to the invention, there is provided a polyurethane pultrusion article comprising a polyurethane pultrusion composite and a coating layer applied thereon, wherein the coating layer and the polyurethane pultrusion composite have good affinity to each other, and thus the polyurethane pultrusion article provided by the invention has desirable weatherability. Moreover, since the resin matrix of the polyurethane pultrusion composite comprises a reactive flame retardant, the polyurethane pultrusion article provided by the invention has favorable flame retardance.

The polyurethane pultrusion article provided by the invention may be prepared by applying a coating composition on the surface of the polyurethane pultrusion composite, wherein the coating composition may be one of the coating compositions commonly used in the art, including but not limited to polyurethane coating, fluorocarbon coating, perchlorovinyl coating, chlorinated rubber coating, epoxy resin coating. In preferred embodiments of the invention, the coating composition is selected from fluorocarbon coating, preferably from fluoroalkene-vinyl ether (FEVE) coating and polyvinylidene fluoride (PVDF) coating. The coating composition may be applied on the polyurethane pultrusion composite by any means commonly used in the art, such as spin coating, knife coating, micro-gravure coating, direct gravure coating, offset gravure coating, reverse gravure coating, reverse roll coating, bar coating, die coating, spray coating or dip coating.

In some embodiments of the invention, one or more primers are applied on the polyurethane pultrusion composite before the above coating composition is applied. In some embodiments of the invention, one or more coatings may be formed on the polyurethane pultrusion composite as desired.

The polyurethane pultrusion composite useful for the invention comprises a polyurethane resin matrix and a reinforcement material, and is prepared by a polyurethane pultrusion process. The polyurethane pultrusion process is disclosed by American patents U.S. Pat. Nos. 3,960,629 and 4,935,279, the contents of which are incorporated herein in their entirety by reference. In the polyurethane pultrusion process, a glass fiber is generally drawn out from a yarn creel and allowed to pass through a yarn guide plate, enter a dispensing cartridge and pass through a die cavity. The glass fiber yarn exiting the die cavity is pulled straight using a pulling device, and a die heating system and a die cooling system are started. A dispensing machine is started to pump a resin into the dispensing cartridge to soak the fiber yarn fully. The fiber yarn soaked fully in the resin within the dispensing cartridge is drawn continuously through the die by the pulling device. The resin fiber cures gradually when passing through the heated die, and continues to be drawn out of the die. After cutting, a polyurethane pultrusion composite material is obtained.

The reinforcement material useful for the invention may be selected from the group consisting of glass fibers, carbon nanotubes, carbon fibers, polyester fibers, natural fibers, aramid fibers, nylon fibers, basalt fibers, boron fibers, silicon carbide fibers, asbestos fibers, whiskers, hard particles, metal fibers and combinations thereof. In some preferred embodiments of the invention, the reinforcement material is selected from glass fibers, and the reinforcement material has an amount of 60-85 wt. % based on 100% by weight of the polyurethane pultrusion composite.

The polyurethane resin matrix may be prepared from a polyurethane composition comprising:

A) an isocyanate component comprising one or more polyisocyanates;

B) an isocyanate-reactive component comprising:

b1) a first polyether polyol having a functionality of 2-3 and a hydroxyl number of 10-120 mgKOH/g;

b2) a second polyether polyol having a functionality of 3-8 and a hydroxyl number of 810-1900 mgKOH/g;

b4) one or more isocyanate-reactive flame retardants.

In some preferred embodiments of the invention, the polyurethane composition is an immiscible system.

The organic polyisocyanate as the isocyanate component A) includes organic diisocyanate which may be any aliphatic, cycloaliphatic or aromatic isocyanate known for preparation of polyurethane. Examples include but are not limited to 2, 2'-diphenylmethane diisocyanate, 2, 4-diphenylmethane diisocyanate and 4, 4'-diphenylmethane diisocyanate; mixtures of monomeric diphenylmethane diisocyanates and diphenylmethane diisocyanate homologs having more rings (polymerized MDI); isophorone diisocyanate (IPDI) or oligomers thereof; toluene diisocyanates (TDI), e.g. toluene diisocyanate isomers, e.g. toluene-2, 4-diisocyanate or toluene-2, 6-diisocyanate, or mixtures thereof; tetramethylene diisocyanate or oligomers thereof; hexamethylene diisocyanate (HDI) or oligomers thereof; naphthalene diisocyanates (NDI) or mixtures thereof.

In an embodiment of the invention, the organic polyisocyanate includes diphenylmethane diisocyanate based isocyanates, particularly those comprising pMDI. The functionality of the organic polyisocyanate is preferably 1.9-3.5, more preferably 2.0-2.8. The viscosity of the organic polyisocyanate is preferably 5-600 mPas, more preferably 10-300 mPas as measured at 25° C. according to DIN 53019-1-3.

The organic polyisocyanate may also be used in the form of a prepolymer of a polyisocyanate. The polyisocyanate prepolymer may be obtained by reacting an excessive amount of the organic polyisocyanate described above with a compound having at least two isocyanate-reactive groups at a temperature of 30-100° C., preferably about 80° C. The polyisocyanate prepolymer of the invention preferably has an NCO content of 20-33 wt. %, more preferably 25-32 wt. %. The compounds having at least two isocyanate-reactive groups are well known to those skilled in the art. For example, they are described in Chapter 3.1, Plastics Handbook ("Kunststoffhandbuch, 7, Polyurethanes", Carl Hanser-Verlag, 3rd Ed., 1993), which is incorporated herein in its entirety by reference.

The isocyanate-reactive component B) comprises a first polyether polyol b1) and a second polyether polyol b2). In a preferred embodiment of the invention, the isocyanate-reactive component B) comprises a first polyether polyol b1), a second polyether polyol b2), and a third polyether polyol b3).

The polyether polyol may be prepared by a known process, for example, by reacting an olefin oxide with a starter in the presence of a catalyst. The catalyst is preferably, but not limited to, an alkaline hydroxide, an alkaline alkoxide, antimony pentachloride, boron trifluoride-diethyl etherate or a combination thereof. The olefin oxide is preferably, but not limited to, tetrahydrofuran, ethylene oxide, propylene oxide, 1,2-butylene oxide, 2,3-butylene oxide, styrene oxide, or a combination thereof; preferably ethylene oxide and/or propylene oxide. The starter is preferably, but not limited to, a polyhydroxy compound or a polyamino compound, wherein the polyhydroxy compound is preferably, but not limited to, water, ethylene glycol, 1,2-propanediol, 1,3-propanediol, diethylene glycol, trimethylolpropane, glycerine, bisphenol A, bisphenol S or a combination thereof, and the polyamino compound is preferably, but not limited to, ethylene diamine, propanediamine, butanediamine, hexanediamine, diethylene triamine, toluene diamine or a combination thereof.

In a preferred embodiment of the invention, the functionality of the first polyether polyol is 2-3, and the hydroxyl number thereof is 10-120 mgKOH/g, preferably 20-80 mgKOH/g, more preferably 25-35 mgKOH/g. The content of the first polyether polyol is 5-40 wt %, preferably 10-30 wt %, particularly preferably 10-25 wt %, based on 100% by weight of all the polyether polyols in the isocyanate-reactive component B). The second polyether polyol has a functionality of 3-8, and a hydroxyl number of 810-1900 mgKOH/g; preferably a functionality of 3-5, and a hydroxyl number of 900-1500 mgKOH/g; particularly preferably a functionality of 3, and a hydroxyl number of 1000-1300 mgKOH/g. The content of the second polyether polyol is 5-40 wt %, preferably 8-30 wt %, particularly preferably 10-25 wt %, based on 100% by weight of all the polyether polyols in the isocyanate-reactive component B).

In a still preferred embodiment of the invention, the isocyanate-reactive component B) further comprises a third polyether polyol b3), wherein the third polyether polyol has a functionality of 3-8, and a hydroxyl number of 150-800 mgKOH/g; preferably a functionality of 3-6, and a hydroxyl number of 200-750 mgKOH/g; particularly preferably a functionality of 3, and a hydroxyl number of 250-700 mgKOH/g. The content of the third polyether polyol is 15-80 wt %, preferably 20-70 wt %, particularly preferably 30-60 wt %, based on 100% by weight of all the polyether polyols in the isocyanate-reactive component B).

The isocyanate-reactive component B) may further comprise one or more isocyanate-reactive flame retardants b4). As used herein, the term "isocyanate-reactive flame retardant" refers to a flame retardant comprising an isocyanate-reactive group, wherein the isocyanate-reactive group is hydroxyl group or amino group, for example. These flame retardants can react with the polyisocyanate and thus be incorporated into the polyurethane resin matrix.

In a preferred embodiment of the invention, the isocyanate-reactive flame retardant comprises halogen and/or phosphorus. The isocyanate-reactive flame retardants comprising halogen and useful for the invention include aromatic or aliphatic bromide alcohol, diol or triol, halogenated aliphatic polyether diol and triol. Examples of the aromatic or aliphatic bromide alcohol, diol or triol include but are not limited to tetrabromophthalic anhydride diol, dibromoneopentyl glycol and tribromoneopentyl alcohol (TBNPA). Examples of the halogenated aliphatic polyether diol and trial include but are not limited to IXOL M125 and IXOL B251 available from Solvay Fluor. Examples of tetrabromophthalic anhydride diol include but are not limited to Saytex RB 79 and PHT-4 available from Albemarle and Great Lakes.

The isocyanate-reactive flame retardants comprising phosphorus and useful for the invention include diol bis(2-chloroethyl)phosphate, tri(polyoxyalkylene) phosphate, tri(polyoxyalkylene) phosphite, and tris(dipropyleneglycol) phosphite.

The isocyanate-reactive component B) may further comprise an additive flame retardant, a cross-linking agent, a catalyst, etc.

The additive flame retardant may be an organic or inorganic flame retardant, including but not limited to tris(2-chloroethyl)phosphate (TCEP), tris(2-chloropropyl)phosphate (TCPP), trichloropropyl phosphate (TDCPP), dimethyl methylphosphonate (DMMP), triphenyl phosphate, melamine polyphosphate (MPP) or mixtures thereof. The inorganic flame retardant includes but is not limited to hydrated aluminum hydroxide, hydrated magnesium hydroxide, ammonium dihydrogen phosphate, ammonium monohydrogen phosphate, ammonium chloride, boric acid, hydrated zinc borate (FB) or a mixture thereof.

The cross-linking agent is generally selected to be an active hydrogen atom containing compound having a molecular weight of less than 800, preferably in the range of 18-400. The active hydrogen atom containing compound is preferably, but not limited to, alkyl diol, di-hydrocarbylene diol, polyalkyl polyol, or a mixture thereof, for example: ethylene glycol, 1,4-butanediol, 1,6-hexanediol, 1,7-heptanediol, 1,8-octanediol, 1,9-nonanediol, 1,10-decanediol, diethylene glycol, dipropylene glycol, polyoxyalkylene glycol, or a mixture thereof. The active hydrogen atom containing compound may also include other grafted or unsaturated alkyl diols, or mixtures thereof, for example: 1,2-propanediol, 2-methyl-1,3-propanediol, 2,2-dimethyl-1,3-propanediol, 2-butyl-2-ethyl-1,3-propanediol, 2-butene-1,4-diol, 2-butyne-1,4-diol, or mixtures thereof. The cross-linking agent is generally used in an amount of 0-10 wt %, based on 100% by weight of the total weight of the isocyanate reactive component.

The catalyst is preferably, but not limited to, an amine catalyst, an organometallic catalyst or a mixture thereof. The amine catalyst is preferably, but not limited to, triethylamine, tributylamine, triethylenediamine, N-ethylmorpholine, N,N,N',N'-tetramethylethylenediamine, pentamethyldiethylenetriamine, N,N-methylaniline, N,N-dimethylaniline, or a mixture thereof. The organometallic catalyst is preferably, but not limited to, an organotin compound, e.g. tin (II) acetate, tin (II) octanoate, tin ethylhexanoate, tin laurate, dibutyl tin oxide, dibutyl tin dichloride, dibutyl tin diacetate, dibutyl tin maleate, dioctyl tin diacetate, or a mixture thereof. The amount of the catalyst used is 0.001-10 wt % of the amount of component B) used.

The invention will be further illustrated with reference to the Examples hereafter. The specific examples and procedures disclosed herein are intended to be exemplary, rather than limiting.

EXAMPLES

The starting materials and equipments mentioned herein are described as follows:

Polyether polyol A: a polyether polyol prepared using glycerine as a starter, having a functionality of 3 and a hydroxyl number of 1050 mg KOH/g;

Polyether polyol B: a polyether polyol prepared using glycerine as a starter, having a functionality of 3 and a hydroxyl number of 475 mg KOH/g;

Polyether polyol C: a polyether polyol prepared using glycerine as a starter, having a functionality of 3 and a hydroxyl number of 235 mg KOH/g;

Polyether polyol D: a polyether polyol prepared using propane diol as a starter, having a functionality of 2 and a hydroxyl number of 28 mg KOH/g;

Ixol M125: a flame retardant, available from Solvay Fluor;

Formerz UL 29: an organotin catalyst, available from Momentive Co.;

Baydur18BD101: an internal release agent, available from Bayer Material Science, LLC;

Polyisocyanate 1: a polyisocyanates having a NCO content of 30.5-32.5% and a functionality of 2.8.

FEVE FT fluorocarbon coating: available from Nippon Paint.

Examples 1-8: Preparation of Polyurethane Pultrusion Composite

The components except for the polyisocyanate component listed in Table 1 were mixed in proportion, and the resulting mixture and the polyisocyanate component were charged separately into a storage tank of a low-pressure double-component static mixer for polyurethane.

276 glass fiber yarns were drawn out from a yarn creel and allowed to pass through a three-level yarn guide plate, enter a dispensing cartridge and pass through a die cavity. The glass fiber yarns exiting the die cavity were bound tightly with a pulling rope, and a crawler was started to pull the yarns forward until all the yarns were pulled straight. A die heating system was started to heat the die. Meanwhile, a die orifice cooling system was started. The temperatures in the die from the inlet to the outlet were controlled to be 20° C./60° C./190° C./170° C. A dispensing machine was started to pump continuously the above components in the amounts shown in Table 1 to a static mixing head. After mixing in the mixing head, the dispensing cartridge was filled completely. Meanwhile, the glass fiber yarns were soaked fully. The fiber yarns soaked fully in the dispensing cartridge were pulled through the die continuously by the crawler. After cured by the heated die, the fiber yarns became a flat sheet and then pulled out of the die continuously. The flat sheet was cut into 100 mm*50 mm test sample plates for subsequent coating test.

The flame retardance of the composite material was tested according to GB8624-2006 standard, and the test results are shown in Table 1.

TABLE 1

Polyurethane compositions for preparing composite materials

|  | Comparative Example 1 | Example 1 | Example 2 | Example 3 | Example 4 |
|---|---|---|---|---|---|
| Polyether polyol A | 30.00 | 25.00 | 24.00 | 25.00 | 25.00 |
| Polyether polyol B | 25.00 | 25.00 | 25.00 | 25.00 | 22.00 |
| Polyether polyol C | 25.00 | 25.00 | 26.00 | 22.00 | 20.00 |
| Polyether polyol D | 20.00 | 17.00 | 13.00 | 13.00 | 13.00 |
| Ixol 251 |  | 8 | 12 | 15 | 20 |
| Molecular sieve desiccant | 4.0 | 4.0 | 4.0 | 4.0 | 4.0 |
| Baydur18BD101 | 4.0 | 4.0 | 4.0 | 4.0 | 4.0 |
| Formerz UL29 | 0.8 | 0.8 | 0.8 | 0.8 | 0.8 |
| Polyisocyanate 1 | 128.0 | 121.0 | 122.0 | 124.7 | 124.9 |
| Flame retardance | B3 | B3 | B3 | B2 | B2 |

Examples 9-16: Preparation of Polyurethane Pultrusion Article

The sample plates of Examples 1-8 were cleaned, dried and dedusted. The sample plates not to be coated with primers were spray coated with a FEVE coating which was filtered through a 200 mesh screen. The wet film thickness of the top coat was about 90 μm. Then, the sample plates were placed into an oven, wherein the temperature was increased gradiently from 40° C. to 100° C. within 30 minutes. After cooling, the sample plates were taken out to obtain the articles. The sample plates to be coated with primers were spray coated with primers manually. Then, the sample plates were placed into an oven, and the temperature was increased gradiently from 40° C. to 100° C. within 30 minutes. After cooling, the sample plates were taken out and spray coated with top coats in the manner described above, and the articles were then obtained.

For the articles obtained, the adhesion of the coating was tested according to GBT9286-1998. The 100-grid method was used to test the adhesion between the coating and the composite material, and the test results are shown in Table 2, wherein the meaning of numbers 0-5 is shown in Table 3. In this method, a 100-grid knife was used to form 10*10=100 squares on a sample, and then a pressure sensitive transparent tape was adhered to the squares. Subsequently, the tape was torn off with an instantaneous force. The peeling area was recorded, and grades were given according to the criteria shown in Table 3.

TABLE 2

Polyurethane pultrusion articles and test results

|  | Comparative Example 2 | Example 5 | Example 6 | Example 7 | Example 8 |
|---|---|---|---|---|---|
| Test sample plates | Comparative Example 1 | Example 1 | Example 2 | Example 3 | Example 4 |
| FEVE FT + primer | 5 | 0 | 0 | 0 | 0 |
| FEVE FT, no primer | 5 | 1 | 0 | 0 | 0 |

TABLE 3

Explanation of the test results obtained by the 100-grid method

| Grade | Description |
|---|---|
| 0 | The cut edges are very smooth, and no peeling occurs at the grid edges. |
| 1 | Tiny peeling occurs at the intersections of the cuts, and the real damage in the grid area is ≤5%. |
| 2 | Peeling occurs at the edges and/or intersections of the cuts, and the peeling area is greater than 5% to 15%. |
| 3 | Partial peeling or large peeling occurs at the cut edges, or a portion of the grids are peeled off wholly. The peeling area is greater than 15% to 35%. |
| 4 | Large peeling occurs at the cut edges or some square grids are peeled off partially or wholly, and the peeling area is greater than 35% to 65% of the grid area. |

TABLE 3-continued

Explanation of the test results obtained by the 100-grid method

| Grade | Description |
|---|---|
| 5 | Flaky peeling of coating occurs at the edges or intersections of the scores, and the total peeling area is greater than 65%. |

The above results show that the polyurethane pultrusion article of the invention not only has favorable flame retardance, but also exhibits good adhesion between the coating and the composite.

What is claimed is:

1. A polyurethane pultrusion article, comprising a polyurethane pultrusion composite and a coating layer applied thereon, wherein the coating layer is prepared from fluoroalkene-vinyl ether coating and/or polyvinylidene fluoride coating, wherein the polyurethane pultrusion composite comprises a polyurethane resin matrix and a reinforcement material, and is prepared by a polyurethane pultrusion process, wherein the polyurethane resin matrix is prepared from a polyurethane composition comprising:
   A) an isocyanate component comprising one or more polyisocyanates; and
   B) an isocyanate-reactive component comprising:
      b1) a first polyether polyol having a functionality of 2-3 and a hydroxyl number of 10-120 mgKOH/g;
      b2) a second polyether polyol having a functionality of 3-8 and a hydroxyl number of 810-1900 mgKOH/g;
      b3) a third polyether polyol having a functionality of 3-8 and a hydroxyl number of 150-800 mgKOH/g; and
      b4) one or more isocyanate-reactive flame retardants comprising halogen and phosphorus;
   wherein the amount of reinforcement material is 60-85 wt. % based on 100% by weight of the polyurethane pultrusion composite.

2. The polyurethane pultrusion article according to claim 1, wherein the isocyanate-reactive flame retardant b4) is selected from the group consisting of: aromatic or aliphatic bromide alcohol, aromatic or aliphatic bromide diol, aromatic or aliphatic bromide triol, halogenated aliphatic polyether diol, halogenated aliphatic polyether triol, and combinations of any thereof.

3. The polyurethane pultrusion article according to claim 1, wherein the reinforcement material is selected from the group consisting of: glass fibers, carbon nanotubes, carbon fibers, polyester fibers, natural fibers, aramid fibers, nylon fibers, basalt fibers, boron fibers, silicon carbide fibers, asbestos fibers, whiskers, hard particles, metal fibers, and combinations of any thereof.

4. The polyurethane pultrusion article according to claim 1, wherein the coating layer is prepared by spin coating, knife coating, micro-gravure coating, direct gravure coating, offset gravure coating, reverse gravure coating, reverse roll coating, bar coating, die coating, spray coating, or dip coating.

* * * * *